E. P. Barton,
Windlass Water Elevator,

Nº 44,386.  Patented Sep. 27, 1864.

Witnesses
Wm. F. McNamara
J. P. Hall

Inventor
Ezra P. Barton
per Munn & Co.
Attorneys

UNITED STATES PATENT OFFICE.

EZRA P. BARTON, OF WINDSOR, NEW YORK.

IMPROVEMENT IN WATER-ELEVATORS.

Specification forming part of Letters Patent No. 44,386, dated September 27, 1864.

*To all whom it may concern:*

Be it known that I, EZRA P. BARTON, of Windsor, in the county of Broome and State of New York, have invented a new and useful Improvement in Water-Elevators; and I do hereby declare that the following is a full, clear, and exact description thereof, which will enable those skilled in the art to make and use the same, reference being had to the accompanying drawings, forming part of this specification, in which—

Figure 1:
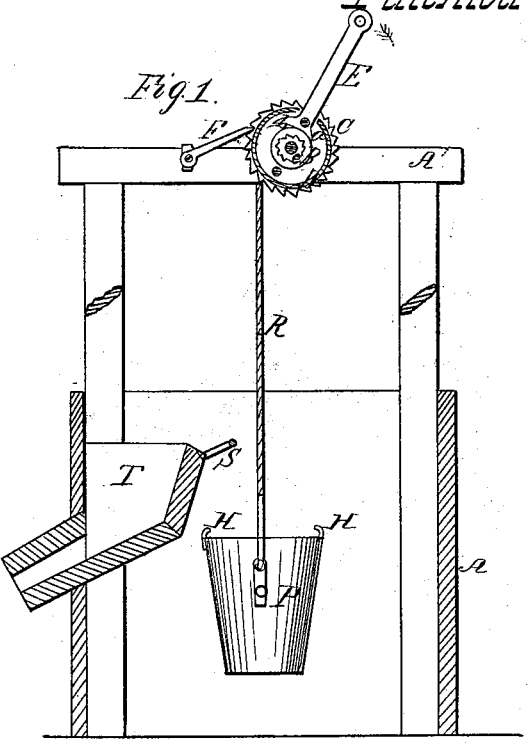
Figure 2:
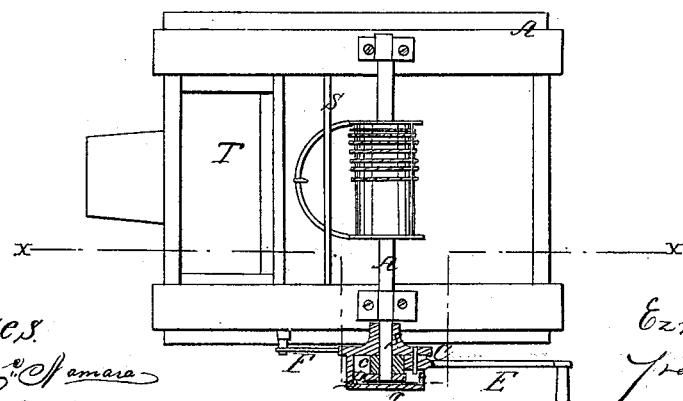

Figure 1 represents a well-box with my improvement in vertical section in the line $x$, Fig. 2. Fig. 2 is a plan of the well-box, showing the drum and the parts that elevate the bucket in horizontal section.

Similar letters of reference indicate corresponding parts.

A' represents the well-box and its frame, upon the cross pieces of which are secured metallic journal boxes to carry the shaft A of the windlass, around which the rope R of the bucket P passes. The bucket is tipped, so as to pour its contents into the trough T, by means of the hooks H, which catch under the guard-rod S. A disk, B, with a smooth periphery, is rigidly secured upon one end of the shaft A, and a ratchet-wheel, $c$, is also rigidly secured to the shaft and adjacent to the disk. The ratchet-wheel and the disk may be made of one piece of metal, keyed or otherwise properly secured to the shaft, the diameter of the disk being greater than that of the ratchet-wheel about in the proportions shown in the figures. A box or drum, D, with a hub, $s$, fitted loosely upon the shaft, incloses the disk and ratchet-wheel, and when its cover or face-plate $r$ is screwed in its place they are entirely protected from dust and other causes of injury. A series of ratchet-teeth, C, inclined in the same general direction with those of the ratchet-wheel $c$, are made upon the periphery of the box D, and a pawl, F, engages them when the box is to be held stationary. A crank-arm, E, passes through the periphery of the box alongside of its ratchet-teeth C, and is secured to its inner face by means of one of the screw-bolts which hold the cover of the box in its place, and which are secured by nuts in the opposite side of the box. Studs are made to project from the inner face of the cover, which fit into recesses cut in the inner periphery of of the box, so as to aid the screw-bolts in holding the cover securely.

The crank-arm moves about the screw-bolt represented by the Fig. 1 as about a fulcrum, and its shorter arm is formed like the segment of a circle, or of crescent form, with one of its limbs narrowed, so that its narrow limb $a'$ will engage the ratchet-wheel $c$ when the crank-arm is inclined in the direction of the arrow, at which time the other limb, $b$, will fall away from the periphery of the disk B, and when the crank-arm is moved in the opposite direction the narrow limb or pawl will fall out of contact with the ratchet-wheel and the broad limb will fall upon the disk B and act as a brake.

The operation of the parts is as follows: The crank-arm being properly secured in its place, its movement to the right carries with it the box D, and its pawl $a$, engaging with the ratchet-wheel $c$, causes the shaft A to be revolved, and thereby elevates the bucket P. When the crank-arm is released, if it is inclined to the left of a vertical line, its weight will disengage its pawl $a$, and its broad limb $b$ will hug the periphery of the disk B, and hold, or tend to hold, the shaft steady, and prevent the too rapid descent of the bucket into the well. The pawl F, in the meantime, will hold the box D in the position in which the crank left it, and, furthermore, will prevent the revolution of the shaft and crank and the descent of the bucket, whether it is full or empty, should the operator happen to let go the crank while its pawl is yet engaged with the small ratchet-wheel $c$, thus preventing liability to accident and injury to persons as well as to the elevating apparatus.

I am aware that devices have been projected to accomplish results somewhat similar to those I desire to obtain, among which are George Race's patent, June 25, 1861, and Gray and Patrick's rejected application, filed June 10, 1861. I disclaim the inventions shown by them.

I claim as new and desire to secure by Letters Patent—

The combination of the loose box D, its ratchet-wheel $c$, the disk and ratchet-wheel on the shaft A, with the crank arm or lever E, attached to the box D and armed with a brake and a pawl at its short end, substantially as described.

EZRA P. BARTON.

Witnesses:
A. J. BUTTS,
I. H. HUNT.